(12) United States Patent
Bertsch-Frank et al.

(10) Patent No.: US 6,387,346 B1
(45) Date of Patent: May 14, 2002

(54) PROCESS FOR PRODUCING HYDROGEN PEROXIDE BY DIRECT SYNTHESIS

(75) Inventors: Birgit Bertsch-Frank, Gründau; Ina Hemme, Hanau; Lukas Von Hoppel, Alzenau; Stipan Katusic, Kelkheim; Jürgen Rollmann, Pflaumheim, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/531,270

(22) Filed: Mar. 20, 2000

(30) Foreign Application Priority Data

Mar. 20, 1999 (DE) .......................... 199 12 733

(51) Int. Cl.⁷ .............................................. C01B 15/01
(52) U.S. Cl. ...................................................... 423/584
(58) Field of Search ......................................... 423/584

(56) References Cited

U.S. PATENT DOCUMENTS

| | | | | |
|---|---|---|---|---|
| 4,772,458 A | * | 9/1988 | Gosser et al. | 423/584 |
| 4,832,938 A | * | 5/1989 | Gosser et al. | 423/584 |
| 5,128,114 A | * | 7/1992 | Schwartz | 423/584 |
| 5,505,921 A | * | 4/1996 | Luckoff et al. | 423/584 |
| 5,525,570 A | | 6/1996 | Chakraborty et al. | |
| 5,852,768 A | | 12/1998 | Jacobsen | |
| 6,074,754 A | | 6/2000 | Jacobsen | |

FOREIGN PATENT DOCUMENTS

| | | |
|---|---|---|
| DE | 41 27 918 A1 | 9/1992 |
| DE | 195 45 455 | 12/1996 |
| DE | 196 42 770 A1 | 4/1998 |
| DE | 196 47 038 A1 | 5/1998 |
| DE | 198 16 296 A1 | 10/1999 |
| EP | 0 274 830 B1 | 7/1988 |
| EP | 0 366 419 A1 | 2/1990 |
| EP | 0 579 109 A1 | 1/1994 |
| EP | 0 591 881 A1 | 4/1994 |
| EP | 0 593 167 A1 | 4/1994 |
| JP | 7-241473 | 9/1995 |

* cited by examiner

Primary Examiner—Wayne A. Langel
(74) Attorney, Agent, or Firm—Pillsbury Winthrop LLP

(57) ABSTRACT

A process for the direct synthesis of hydrogen peroxide from hydrogen and oxygen is carried out in the presence of a noble metal catalyst. The selectivity for $H_2$ and/or the maximum $H_2O_2$ concentration can be increased by using a catalyst of palladium or at least two metals selected from Group VIII and Group I of the Periodic Table of Elements, which catalyst has been produced by spray pyrolysis or flame pyrolysis.

15 Claims, No Drawings

PROCESS FOR PRODUCING HYDROGEN PEROXIDE BY DIRECT SYNTHESIS

CROSS-REFERENCE TO RELATED APPLICATION

This application is based on German Application DE 199 12 733.6, filed Mar. 20, 1999, which disclosure is incorporated herein by reference.

FIELD OF THE INVENTION

The invention relates to a process for producing hydrogen peroxide by direct synthesis. In the process hydrogen and oxygen are converted in the presence of a heterogeneous catalyst containing at least one noble metal, in particular palladium, as its catalytically active component, in the presence or absence of a solvent. Use of a catalyst according to the invention provides advantages over the use of previously known catalysts with regard to $H_2$ selectivity and/or the attainable $H_2O_2$ concentration.

BACKGROUND OF THE INVENTION

The direct synthesis of hydrogen peroxide by converting hydrogen and oxygen in an acidic aqueous medium in the presence of a noble metal supported catalyst is known from various references, for example, European Patent Disclosure EP-B 0 272 830. In the process described in this reference and also in the processes referred to therein, an aqueous reaction medium is used which, for the sake of inhibiting the decomposition of hydrogen peroxide formed contains a strong acid, such as $H_2SO_4$ and/or HCl. Pd on activated charcoal, or other heterogeneous catalysts containing Pd and/or Pt, catalyze the composition. By adding a bromide promoter, the selectivity is increased. This process has various problems, among them selectivity that is too low and/or too low an attainable $H_2O_2$ concentration, and/or a low space-time yield, and sometimes also a high catalyst discharge; as a result, the industrial expense required for recovering the catalyst increases, and the $H_2$ selectivity drops as the service life of the catalyst increases.

Many references are accordingly directed to furnishing improved catalysts for this process. In the process of European Patent Disclosure EP-A 0 366 419, a gas mixture containing $H_2$ and $O_2$ is passed through a catalyst bed disposed in a trickle-bed reactor, while at the same time an aqueous phase containing $H_2SO_4$ and HCl is trickled in parallel flow over the catalyst bed. Although high selectivity is attained in this process by using a noble metal catalyst bonded to a hydrophobic support, under the usual pressure and temperature conditions, nevertheless the high selectivity is at the disadvantageous cost of a very low $H_2O_2$ concentration (0.15 to 0.3%). To obtain commercial $H_2O_2$ solutions, complicated concentration and/or distillation steps must follow, which thus reduce the economy of the process.

In the process according to Japanese Patent Disclosure JP-A 7-241473, with a conventional reaction sequence, hydrogen and oxygen are reacted in an acidic aqueous medium in the presence of catalyst particles with a particle size below 50 nm that are applied to hydrophobic support particles. The catalyst particles are gold particles, while the hydrophobic support particles are hydrophobic or hydrophobized organic and inorganic substances. The production of the hydrophobic support that contains gold particles includes precipitation of a basic gold salt onto the hydrophobic vehicle from an aqueous solution that contains $HAuCl_4$ and a reduction and/or calcination step for converting the gold compound to elemental gold. In a trickle-bed reactor, a 4.8 wt. % aqueous hydrogen peroxide solution is obtained with 80% selectivity.

A further trickle-bed process is taught by EP-A 0 579 109. Here an aqueous phase in parallel flow with the gas mixture containing the $H_2$ and $O_2$ is trickled over a catalyst bed based on a noble metal that is bonded to either activated charcoal, an inorganic oxide, or a sulfate. It is essential to adhere to a certain volume ratio of the gas phase to the liquid phase. With good selectivity for $H_2$, an aqueous hydrogen peroxide solution with a content of approximately 5 wt. % is obtained. An increase in the $H_{2O2}$ concentration is successfully achieved in the process described in German Patent Application DE 198 16 297.9, in which a gas mixture containing hydrogen and oxygen, which is substantially saturated or supersaturated with water vapor, is delivered to the reactor, and the aqueous phase is only then formed by condensation. In this process, known catalysts are used, in particular those having one or more elements of Group VIII and/or Group I of the periodic system. The catalytically active elements are typically bonded to a particulate or monolithic support.

In the postprocessing of the example in EP-A 0 579 109, it has been demonstrated that if a catalyst based on 2 wt. % Pd on activated charcoal is used with the aqueous hydrogen peroxide, a high palladium discharge is brought about, which shortens the service life of the catalyst.

In German Patent Disclosure DE-A41 27 918, a palladium/gold alloy with a content of 5-95 wt. % gold on a solid support such as carbon or aluminum oxide is used as the catalyst for the described reaction, in order to obtain a high formation speed, high yield and high selectivity. The production of the catalyst requires a two-stage process. As has been demonstrated, in this case also there is a need to increase the $H_2$ selectivity and the $H_2O_2$ concentration.

SUMMARY OF THE INVENTION

The object of the present invention is accordingly to provide an improved process of this general type that leads to higher $H_2$ selectivity and/or to higher $H_2O_2$ concentration. In a preferred embodiment, ways are also to be shown in which the noble metal discharge from the reactor can be reduced and the aqueous hydrogen peroxide and thus the service life of the catalyst can be increased.

The invention comprises a process for producing hydrogen peroxide by direct synthesis, in which hydrogen and oxygen are converted in the presence of a heterogeneous catalyst containing at least one noble metal, in particular palladium, as its catalytically active component, in the presence or absence of a solvent. The catalyst used has a catalytically active component that substantially comprises palladium or at least two metals selected from the platinum group (Group VIII) and Group I of the Periodic Table of Elements and which has been produced by spray pyrolysis or flame pyrolysis, including the conversion of a solution or suspension, containing compounds of the one or more catalytically active metals in a suitable elemental ratio in dissolved form, into a gas-supported particle collective. introduction thereof into a spray pyrolysis or flame pyrolysis reactor, the compounds of the catalytically active metals being converted substantially into these metals or alloys thereof, and separation of the solid particles formed from the gas stream.

The process according to the invention can be performed using the catalytically active component, that is, the palladium or noble metal alloy obtained by spray or flame pyrolysis, or a combination of catalytically active components. As an alternative, and generally preferably, these catalytically active metals or alloys are used in supported form. The supports can be particulate materials, such as powders, extrudates, granulates, or other molded bodies made from a powdered material. For producing the supported catalysts that contain the catalytically active component or components, known processes can be employed. For instance, it is possible for the powder of the catalytically active component produced by spray pyrolysis or preferably by flame pyrolysis to be mixed with a powdered support material, plasticized, and deformed, and then for the molded bodies to be solidified by calcination. It is also possible for the metal powder to be mixed with a support or carrier and made into tablets. It is additionally possible for the powdered catalytic component or components to be dispersed in a suitable liquid and impregnated into an already prefabricated molded support. Then, depending on the type of procedure employed, either a catalyst largely saturated with metal or a so-called eggshell catalyst, in which the metal is located only in the outermost zone of the support, or even a so-called subsurface-shell catalyst, in which the nucleus and the outermost shell of the support are largely free of the catalytic component, can be obtained. The production of the supported catalysts from the support material and the catalytically active component or components can be carried out in the presence or absence of organic or inorganic binders.

Examples of suitable binders are water glass, calcium oxalate, boric acids, and other glass-forming compositions. Organic binders, although they are less suitable for the purpose in question, are for instance polyolefins and fluorocarbonated polymers and organosilanes. Good fixation of the catalytically active component to the support is also possible by calcination, with the calcination being expediently performed at a temperature above 200° C., in particular at 300–600° C., and especially preferably at 400–600° C., By means of a calcining step and especially preferably by the use of binders, or a combination of these provisions, supported noble metal catalysts are obtained which, in the generic process, with the aqueous hydrogen peroxide, discharge substantially less noble metal than was the case with the use of many previously known catalysts, and preferably discharge no noble metals at all.

The production of the catalytically active component containing at least one noble metal by the so-called spray pyrolysis technique or the flame pyrolysis technique is known in this field. For instance, EP-A 0 591 881 discloses a process for producing fine noble metal powders by spray pyrolysis: A solution of a thermally decomposable noble metal compound, or a mixture of such compounds, in a volatile solvent is converted into an aerosol. This aerosol is treated in an inert carrier gas in a pyrolysis reactor, at a temperature above the temperature of decomposition of the noble metal compound or compounds and below the melting point of the noble metal or noble metal alloy. The finely powdered metal or metal alloy formed is then separated from the carrier gas. The pyrolysis reactor can also, according to EP-A 0 593 167, be operated at a temperature above the melting point of the noble metal or noble metal alloy.

In so-called flame pyrolysis, the aerosol of superfine droplets in solution or suspension is fed into a flame reactor, such as an oxyhydrogen gas flame according to the J. Chem. Soc. Japan (1987), Vol.12, pages 2293–2300, or into the flame of a flame reactor, such as in German Patent DE-PS 195 45 455, in which the hydrogen combusts with the ambient air The advantage of the noble metal powder obtained in a flame reactor is its very high uniformity with respect to the composition and its very uniform snape. A very narrow particle size spectrum is also obtained.

In a further embodiment of the process of the invention, supported noble metal catalysts are used in which not only the catalytically active component but also the support material, which is an oxidic or silicate material, are simultaneously obtained by flame pyrolysis. Such catalysts can be obtained in accordance with German Patent Disclosure DE-A 196 47 038 by providing that the solution to be converted into an aerosol contains not only one or more noble metal compounds but additionally one or more oxide- and/or silicate-forming precursors. In the pyrolysis reactor, oxidic or silicate carrier particles are formed from these precursors, with particles of noble metal or noble metal alloy superfinely distributed on and/or in the carrier particles. DE-A 196 47 038 is expressly incorporated by reference herein.

In a further alternative, suitable supported catalysts for the generic process can also be obtained by delivering an aerosol, having superfine droplets that contain not only one or more dissolved noble metal compounds but also the undissolved support material in superfine form, to the flame pyrolysis reactor or to a reactor heated by an electric plasma and/or inductive plasma. In this embodiment, the catalytically active noble metal particles settle on the surface of the carrier particles and are solidly fixed to the carrier particles. This embodiment is described in German Patent Application DE 198 21 144.9, and the content thereof is hereby expressly incorporated into the disclosure of the present application.

Besides palladium, which is known to be especially effective as a catalyst, the catalysts preferably include promoters selected from the group comprised of platinum, rhodium, iridium, copper, silver and gold. In a preferred embodiment of the process of the invention, a catalyst is used in which the catalytically active component is a palladium alloy, containing at least 80 wt. % of palladium and from 0.05 to 15 wt. % of gold and/or 0.05 to 15 wt. % of platinum and 0 to 5 wt. % of silver, possibly together with typical impurities. Especially suitable support materials are oxidic and silicate supports, in particular $Al_2O_3$, $TiO_2$, ZrO2, $SnO_2$, $SiO_2$, $Ce_2O_3$ and zeolites.

As has been demonstrated by comparative tests, the catalysts to be used in accordance with the invention can be used to perform different but intrinsically known direct synthesis processes for producing hydrogen peroxide in the presence of an aqueous or alcohol (DE-A 196 42 770) phase. Analogously, the process can also be performed in accordance with International Patent Disclosure WO97/32812 in the absence of any solvent at all; the reaction gas mixture flowing through a fixed catalyst bed is unsaturated with water and hydrogen peroxide, and hydrogen peroxide formed is separated from the reaction gas in a downstream separation stage.

The advantages of the process of the invention are that it has become possible, by means of the particular selection of the catalyst, to increase the selectivity and/or the attainable hydrogen peroxide concentration significantly. This increase in effectiveness of the catalytic system was surprising, because the surface area of the catalytically active component, in the form in which it can be obtained by a spray pyrolysis or flame pyrolysis technique, is substantially less than that of conventional catalysts, such as those in which the production includes a precipitation step and a thermal and/or chemical reduction step.

DETAILED DESCRIPTION OF THE PREFERRED EMBODIMENTS

The invention will be described in further detail in conjunction with the following examples and comparative examples.

EXAMPLES AND COMPARATIVE EXAMPLES
Production of the Catalytically Active Noble Metal Component (General Formula) by Flame Pyrolysis An aqueous solution of noble metal salt or salts, particularly chlorides or nitrates, in a total concentration of 2.5 to 6 weight % is atomized with an ultrasonic aerosol generator or an ultrasonic atomizer into a fine aerosol. With the aid of a carrier gas (air or nitrogen), the aerosol is passed through a droplet trap, and droplets with a diameter of greater than 10 μm are recycled. After that, the aerosol passes to a predrying station in which it is thermally treated; the temperature is between 100° and 200° C., and the dwell time is between 1 and 10 seconds.

The aerosol is then transported to a closed reactor having the following parameters:

Reactor length: 1000 mm; mean width: 125 mm. Aerosol nozzle in the reactor: d =46 mm; $H_2$ ring nozzle of 52 to 54 mm, air ring nozzle of 61 to 80 mm. The reactor contains three temperature measuring probes (top, middle, bottom). $H_2$ is used as the burner gas.

For the preparation of the alloys, the temperatures in the reactor are below the melting point of these products, in a temperature range from 900°–1050° C., at the top measuring point. After that, the temperature in the flame reactor can drop down to 580° C., by the bottom measuring point. The alloys are separated from the pyrolysis gas by means of a ceramic filter.

Examples 1.1 through 1.4 show the setting parameters and some catalyst material data.

Example 1.1

Starting solution: Aqueous HCl solution (pH =1.5 to 2) containing Pd, Au, Ag and Rh; noble metal content, 4 wt. %.

Process Parameters:
Predrying temperature: =150° C.,
Combustion gas ($H_2$): =1600 l/h
Total gas quantity: =5100 l/h
Lambda ($O_2/H_2$): =1.41
Dwell time (flame pipe): =2.7 sec
Dwell time (predrying): =2.8 sec Powder Data:
Mean particle size (Coulter): 0.95 μm
Particle distribution: 0.15 to 3.9 μm
RFA: Pd: 96.75%, Au: 0.25%,
Ag: 0.2%, Rh: 0.09%

Example 1.2

Starting solution: Aqueous HCl solution (pH =1.5 to 2) containing Pd and Au; noble metal content, 6 wt. %.

Process Parameters:
Predrying temperature: 150° C.,
Combustion gas ($H_2$): 1600 l/h
Total gas quantity: 5100 l/h
Lambda ($O_2/H_2$): 1.40
Dwell time (flame pipe): 2.4 sec
Dwell time (predrying): 3.2 sec Powder Data:
Mean particle size (Coulter): 1.62 μm
Particle distribution: =0.08 to 7 μm
RFA: Pd: 95.0%, Au: =5%
BET surface area ($m^2/g$): =4.7
Particle form (SEM): =clumps of spherical particles

Example 1.3

Starting solution: Aqueous HCl solution (pH =1.5 to 2) containing Pd, Au and Ag; noble metal content, 4 wt. %.

Process Parameters:
Predrying temperature: 150° C.,
Combustion gas ($H_2$): 1600 l/h
Total gas quantity: 4300 l/h of reactor gas +700 l/h of quenching gas
Lambda ($O_2/H_2$): 1.40
Dwell time (flame pipe): 3.3 sec
Dwell time (predrying): 3.3 sec Powder Data:
Mean particle size (Coulter): 0.63 μm, bimodal particle distribution
Particle distribution: 0.16 to 3.6 μm
RFA: Pd: 89.13%, Ag: 1.78%,
Au: 0.22%, Chlorine: 8.84%; traces of Rh, Cr, Fe, Hf, Cu
BET surface area (m2/g): 5.4
Particle form (SEM): clumps of spherical particles

Example 1.4

Starting solution: Aqueous nitric acid solution (pH =0.1 to 2.5 ) containing Pd, Pt, and Ag; noble metal content, 6 wt. %.

Process Parameters:
Predrying temperature: 150° C.,
Combustion gas ($H_2$): 1300 l/h
Total gas quantity: 4300 l/h of reactor gas +1200 l/h of quenching gas
Lambda ($O_2/H_2$): 1.40
Dwell time (flame pipe): 3.3 sec
Dwell time (predrying): 5.1 sec Powder Data:
Mean particle size (Coulter): 0.45 μm
Particle distribution: 0.04 to 8.5 μm
RFA: Pd: 89.91%, Pt: 8.72%,
Ag: 0.32%
BET surface area ($m^2/g$) 2.1 (±0.2)

Production of Supported Catalysts (general formula).

For application to the support, the noble metal powder is suspended in a solution ($H_2O$, organic solvent); after that, a molded body of an oxidic support material is impregnated. For evaporating the solvent, the impregnated molded body is heated in an oven, first for 2 hours at 150° C., and then for a further hour at 300° C., if indicated, the molded body is calcined. The support material was in the form of a spherical granulate with a particle diameter in the range of essentially 0.15 to 0.25 mm.

Example 2.1

500 g of a commercially available $SiO_2$ catalyst support (made by Norton) were dried in a drying cabinet overnight at 180° C., The dried material was transferred to a dish that was heated to 150° C., 50 g of a powder that had been made in accordance with Example 1.1 were dispersed in 200 ml of water The resultant suspension was poured all at once over the preheated catalyst support, and the material was then dried. The result was an eggshell-like catalyst. Upon use in a liquid medium, however, it shed metal particles.

Example 2.2

The procedure was the same as in Example 2.1, but the drying was followed by calcination at 500° C., over 4 h. The material thus obtained shed hardly any further metal particles.

Example 2.3

The procedure was the same as in Example 2.2, but approximately 0.1 g of water glass as a binder was added to the solution used in the impregnation. After the temperature treatment, the material thus obtained shed no further metal particles.

Example 2.4

500 g of the support according to Example 2.1 was saturated with water until the pores were full. An aqueous solution that comprised approximately 0.2 g of water glass, 50 g of metal powder according to Example 1.1, and 150 ml of water, was then added to the carrier, and the water was slowly removed in a rotary evaporator.

After drying, calcination followed at 500° C., over 4 h. After tempering, the material thus obtained shed no metal particles.

Direct Synthesis of Hydrogen Peroxide

The various catalysts were tested by the process according to EP-A 0 579 109 in a trickle-bed reactor and in accordance with DE-A 41 27 918 in an agitator autoclave. The catalysts used in the examples from the previously known processes were a commercially available catalyst, namely 2% Pd on activated charcoal in the trickle-bed reactor and a Pd/Au catalyst in the agitator reactor.

Table 1 below shows the reaction conditions and results of the tests in the trickle-bed, using the catalyst recited in EP-A 0 579 109 and two catalysts produced according to the invention. Table 2 correspondingly shows the results of the tests in the agitator reactor, and for comparison purposes, the data from the best example (35) in DE-A 41 27 919.

TABLE 1

$H_2O_2$-Synthesis in the Trickle-Bed

| Test | Adjusted EP 0 579 109 A1 | Example 3.1 | Example 3.2 | Example 3.3 |
|---|---|---|---|---|
| Apparatus | Trickle-Bed Autoclave, Inside Diameter 10.3 mm, Length 1.2 m | Trickle-Bed Autoclave, Inside Diameter 10.3 mm, Length 1.2 m | Trickle-Bed Autoclave, Inside Diameter 10.3 mm, Length 1.2 m | Trickle-Bed Autoclave, Inside Diameter 10.3 mm, Length 1.2 m |
| Catalyst | 40 g 2% Pd on Activated Charcoal 0.15–0.25 mm | 100 ml 1.9% Pd/0.1% Au, per Example 1.2, on $SiO_2$ 0.15–0.25 mm, Preparation per Example 2.1 | 100 ml 1.9% Pd/0,1% Au, per Example 1.2, on $SiO_2$ 0.15–0.25 mm, Preparation per Example 2.3 | 100 ml 1.8% Pd/0.2% Pt, per Example 1.4, on $SiO_2$ 0.15–0.25 mm, Preparation per Example 2.3 |
| Reaction Solution | Liquid at: 0.75 L/h, Aqueous 0.1 molar $H_2SO_4$ 0.001 molar NaBr | Liquid at: 0.75 L/h, Aqueous 0.1 molar $H_2SO_4$ 0.001 molar NaBr | Liquid at: 0.75 L/h, Aqueous 0.1 molar $H_2SO_4$ 0.001 molar NaBr | Liquid at: 0.75 L/h, Aqueous 0.1 molar $H_2SO_4$ 0.001 molar NaBr |
| Reaction Conditions | 60 bar, 52° C., 5.3 Vol % $H_2$, 60 Vol. % $O_2$, Remainder $N_2$ 1500 N L/h, no gas recycling | 60 bar, 52° C., 5.3 Vol % $H_2$, 60 Vol. % $O_2$, Remainder $N_2$ 1500 N L/h, no gas recycling | 60 bar, 52° C. 5.3 Vol % $H_2$, 60 Vol. % $O_2$, Remainder $N_2$ 1500 N L/h, no gas recycling | 60 bar, 52° C. 5.3 Vol % $H_2$, 60 Vol. % $O_2$, Remainder $N_2$ 1500 N L/h, no gas recycling |
| Test Duration | 8 Hours | 8 Hours | 8 Hours | 8 Hours |
| $H_2$ - Selectivity | 80% | 83% | 83% | 80% |
| $H_2O_2$ Concentration Achieved | 5.0 weight % 0.80 L/h draw-off | 5.1 weight % 0.80 L/h draw-off | 5.1 weight % 0.80 L/h draw-off | 6.5 weight % 0.82 L/h draw-off |
| Remarks | Pd on $H_2O_2$ Activity lost over the further course of the reaction | Pd in $H_2O_2$ Activity lost over the further course of the reaction | <0.1 mg Pd per l $H_2O_2$ Reaction can be continued with same selectivity and $H_2O_2$-concentration | <0.1 mg Pd and Pt per l $H_2O_2$; Reaction can be continued with same selectivity and $H_2O_2$-concentration |

TABLE 2

$H_2O_2$-Synthesis in the Agitator Autoclave

| Test | DE 41 27 918, Example 35 | Example 3.4 | Example 3.5 |
|---|---|---|---|
| Apparatus | 300 ml Agitator autoclave, Teflon lining, Gas ducting | 500 ml Agitator autoclave, Teflon lining, Gas ducting | 500 ml Agitator autoclave, Teflon lining, Gas ducting |
| Catalyst | 40 mg Catalyst: 3.5% Pd and 1.5% Au on unspecified support (activated charcoal?) 50 mg Pd/Au per liter of liquid phase | 262 mg Catalyst: 9% Pd/1% Au on $SiO_2$ Preparation per Example 2.2 262 mg Pd/Au per liter of liquid phase | 262 mg Catalyst: 9% Pd/1% Au on $SiO_2$ Preparation per Example 2.3 262 mg Pd/Au per liter of liquid phase |
| Reaction Solution | 40 ml 1.6 mol/L $H_3PO_4$ 0.0006 mol/L NaBr | 100 ml 0.1 molar $H_2SO_4$ 0.0001 molar NaBr | 100 ml 0.1 molar $H_2SO_4$ 0.0001 molar NaBr |
| Reaction Conditions | 80 bar 25° C. 100 N L/h | 80 bar 25° C. 200 N L/h | 80 bar 25° C. 200 N L/h |

TABLE 2-continued

H$_2$O$_2$-Synthesis in the Agitator Autoclave

| Test | DE 41 27 918, Example 35 | Example 3.4 | Example 3.5 |
|---|---|---|---|
| | 4.5 Vol.% Hydrogen | 4.5 Vol. % Hydrogen | 4.5 Vol. % Hydrogen |
| | 95.5 Vol.% Oxygen | 95.5 Vol. % Oxygen | 95.5 Vol. % Oxygen |
| Test Duration | 2 Hours | 2 Hours | 2 Hours |
| H$_2$-Selectivity | 72% | 87% | 89% |
| H$_2$O$_2$-Concentration Achieved | 4.4 weight % | 8.3 weight % | 9.7 weight % |
| Remarks | | 1 mg Pd per liter of H$_2$O$_2$, therefore activity loss over further course of reaction | Pd in H$_2$O$_2$: 0.01 mg/L |

Pressure Indications: Overpressure

What is claimed is:

1. A process for producing hydrogen peroxide by direct synthesis comprising: converting hydrogen and oxygen to hydrogen peroxide in the presence of a heterogeneous catalyst containing at least one noble metal, as its catalytically active component, optionally in the presence of a solvent, wherein the catalytically active component comprises palladium or at least two metals selected from the group consisting of metals of Group VIII and Group I of the Periodic Table of Elements, which component has been produced by spray pyrolysis or flame pyrolysis, including the conversion of a solution or suspension, containing compounds of one or more catalytically active metals in a catalytically effective elemental ratio in dissolved form, into a gas-supported particle collective, introduction thereof into a spray pyrolysis or flame pyrolysis reactor, converting the compounds of the catalytically active metals into said metals or alloys thereof, and separating the solid particles formed from the gas stream.

2. The process of claim 1, wherein the catalytically active component of the catalyst is a palladium alloy containing at least 80 wt. % of palladium, at least one member selected from the group consisting of 0.05 to 15 wt. % of gold and 0.05 to 15 wt. % of platinum, and 0 to 5 wt. % of silver.

3. The process of claim 1, wherein the catalytically active component of the catalyst is bound to or in a support.

4. The process of claim 3, wherein the support comprises a member selected from the group consisting of oxidic supports and silicate supports.

5. The process of claim 4, wherein the support comprises a member selected from the group consisting of Al$_2$O$_3$, TiO$_2$, ZrO$_2$, SiO$_2$ and zeolites.

6. The process of claim 3, comprising using a supported catalyst produced by impregnation of a molded body of support material with a suspension containing the catalytically active component obtained by flame pyrolysis and optionally a binder, and subsequent drying and calcination.

7. The process of claim 3, comprising using a supported catalyst in which the catalytically active component is bound to the support by an inorganic or organic binder.

8. The process of claim 7, wherein the binder comprises water glass.

9. The process of claim 1, comprising using a support-bonded catalyst, wherein at least part of the support or a precursor thereof was present in the gas-supported particle collective.

10. The process of claim 1, wherein the conversion is carried out in the presence of at least one member selected from the group consisting of water, a mineral acid and a halide.

11. The process of claim 1, wherein the at least one noble metal comprises palladium.

12. The process of claim 1, wherein the catalytically active component of the catalyst comprises palladium and a promoter selected from the group consisting of: platinum; rhodium; iridium; copper; silver; and gold.

13. The process as claimed in claim 6, wherein said calcination is conducted a temperature from 300° C. to 600° C.

14. A process for producing hydrogen peroxide by direct synthesis comprising:
   (a) providing a solution or a suspension containing compounds of one or more catalytically active metals in dissolved form, said metals comprising palladium or at least two metals selected from the group consisting of metals of Group VIII and Group I of the Periodic Table of Elements;
   (b) converting said solution or suspension into a gas-supported particle collective;
   (c) introducing said as-supported particle collective into a spray pyrolysis or flame pyrolysis reactor;
   (d) converting the compounds of the catalytically active metals into said metals or alloys thereof in said reactor;
   (e) separating the solid particles formed from the gas stream;
   (f) converting hydrogen and oxygen to hydrogen peroxide in the presence of a catalyst comprising said solid particles. optionally in the presence of a solvent.

15. The process according to claim 14 further comprising forming a supported catalyst comprising said solid particles.

* * * * *

UNITED STATES PATENT AND TRADEMARK OFFICE
CERTIFICATE OF CORRECTION

PATENT NO. : 6,387,346 B1
DATED : May 14, 2002
INVENTOR(S) : Bertsch-Frank et al.

It is certified that error appears in the above-identified patent and that said Letters Patent is hereby corrected as shown below:

Title page,
Item [75], Inventors, change "Lukas Von Hoppel" to -- Lukas Von Hippel --.

Signed and Sealed this

Thirty-first Day of January, 2006

JON W. DUDAS
*Director of the United States Patent and Trademark Office*